United States Patent
Wang

[19]

[11] Patent Number: 6,032,589

[45] Date of Patent: Mar. 7, 2000

[54] SHELF FOR THE TOP OF A MONITOR

[76] Inventor: Chien-Chao Wang, No. 6-2, Lane 6, Hsing-Te Rd., Wen-Shan Dist., Taipei, Taiwan

[21] Appl. No.: 09/206,564

[22] Filed: Dec. 7, 1998

[51] Int. Cl.[7] .................................................... A47B 9/00
[52] U.S. Cl. ................ 108/147.11; 108/156; 248/188.5; 248/918
[58] Field of Search .............................. 108/1, 6, 7, 54.1, 108/56.1, 56.3, 147.11, 156; 248/188, 188.5, 188.9, 408, 918, 148

[56] References Cited

U.S. PATENT DOCUMENTS

| | | | |
|---|---|---|---|
| 887,663 | 5/1908 | Lee | 248/188.9 |
| 2,318,017 | 5/1943 | Schmidt | 248/188.9 |
| 3,092,406 | 6/1963 | Wasserstrom | 403/238 X |
| 4,845,915 | 7/1989 | Rogers et al. | 52/783 X |
| 4,958,737 | 9/1990 | Auerbach | 206/557 X |
| 5,088,669 | 2/1992 | Zinnbauer | 248/188.9 |
| 5,170,972 | 12/1992 | Casals Guell | 248/188.9 |
| 5,379,974 | 1/1995 | Slay et al. | 248/161 X |
| 5,411,045 | 5/1995 | Davis | 135/83 X |
| 5,881,979 | 3/1999 | Rozier, Jr. et al. | 248/188.5 |
| 5,944,290 | 8/1999 | Fuhrmann et al. | 248/161 X |

FOREIGN PATENT DOCUMENTS

| | | | |
|---|---|---|---|
| 387228 | 12/1923 | Germany | 108/1 |
| 567396 | 9/1933 | Germany | 248/188.5 |
| 2143952 | 3/1973 | Germany | 248/188.9 |
| 3630307 | 3/1988 | Germany | 248/188.5 |

Primary Examiner—Eric K. Nicholson
Assistant Examiner—Brian H. Buck
Attorney, Agent, or Firm—Rosenberg Klein & Lee

[57] ABSTRACT

A shelf for the top of a monitor has a base with groups of seriate polygonal sockets formed on the bottom and two support feet each including an upper foot and a lower foot. The upper foot has a top polygonal plug correspondingly fitted into the socket of the base, a series of slots and a channel in communication with each one of the slots. The upper portion of the lower foot is formed to be detachably inserted into the upper foot and has a plurality of axially defined grooves and two T-shaped bosses formed on the opposite sides of the upper end thereof. The bosses are pressed toward each other when the lower foot is inserted into the upper foot. Afterwards, due to the provision of the grooves, the elasticity of the surface of the lower foot enables the bosses to project out from the channel and one of the slots, by which the engagement between the lower foot and the upper foot is secured. The lower foot further has a flanged post pivotally connected with a leveling shoe which has an adhesive coating attached to the bottom thereof for stably attaching the leveling shoe to the surface of the monitor.

8 Claims, 8 Drawing Sheets

SHELF FOR THE TOP OF A MONITOR

BACKGROUND OF THE INVENTION

1. Field of the invention

The present invention relates to a shelf for the top of a monitor, and more particularly to a shelf having two adjustable feet each provided with a leveling shoe fitted on the bottom thereof to stably attach the shelf on the top of a monitor in a level condition.

2. Description of Related Art

A shelf is provided for installation on top of a monitor for placing objects such as a telephone, a fax machine or books thereon in order to save space on a desk.

As shown in FIG. 9, a conventional shelf is comprised of a base (60) and the support members attached thereto. On the bottom of the base (60), two feet (61) are respectively provided near the front end, and two 3×3 matrices of screw holes (62) are respectively provided near the back end.

A pair of leg supports (70) each has an integrally formed top plate (701) provided with three equally spaced holes (72) which respectively correspond to three of the screw holes (62) in one of the matrices and an integrally formed bottom plate (702) defining a hole (72) corresponding to a central hole (72) of the top plate (701). Two screws (71) attach the leg support (70) to the bottom of the base (60) by means of inserting the two screws (71) respectively through the first and the last one of the holes (72) in the top plate (701) into the corresponding two of the screw holes (62) in one of the matrices. A bolt (73) longer than the length of the leg support (70) is inserted through the hole (72) in the bottom plate (702) and the central hole (72) in the top plate (701) and secured in the corresponding screw hole (62) in the matrix. Furthermore, the bolt (73) has a flat foot (74) integrally formed on the end of the bolt. After both of the bolts (74) are threadingly secured in the corresponding screw holes (62) of the base (60) and the feet (61) engage the surface of the monitor (not shown), the base (60) is able to stably stand on top of the monitor.

However, to change the position of the leg supports (70) thereby adjusting the height of the rear part of the base (60), people have to unscrew the screws (71) to release the support leg (70) and move the support leg (70) to the desired position and screw the support leg (70) back on the base (60) again.

Moreover, the foot (74) may not fully contact the monitor top, which will cause the base (60) to be unstable on the monitor.

The spaces between the screw holes (62) may also be too large to satisfy a fine adjustment of the position of the support leg (70).

SUMMARY OF THE INVENTION

The main object of the present invention is to provide a shelf comprising two groups of seriated polygonal sockets respectively formed on the bottom of a base. A pair of feet each includes an upper foot and a lower foot adjustably engaged together. The upper foot has the top end formed with a hollow polygonal plug correspondingly fitted into one of the polygonal sockets. The lower foot has the bottom end pivotally connected with a leveling shoe, which has an adhesive coating attached on the bottom for stably attaching the support foot to the monitor top.

A further object of the present invention is to provide a shelf having a base with slots therein for holding discs.

Another object of the present invention is to provide a shelf having a lip extension on the back edge of the base to prevent objects from falling off the base.

2

DETAILED DESCRIPTION OF PREFERRED EMBODIMENT

Figure 1:
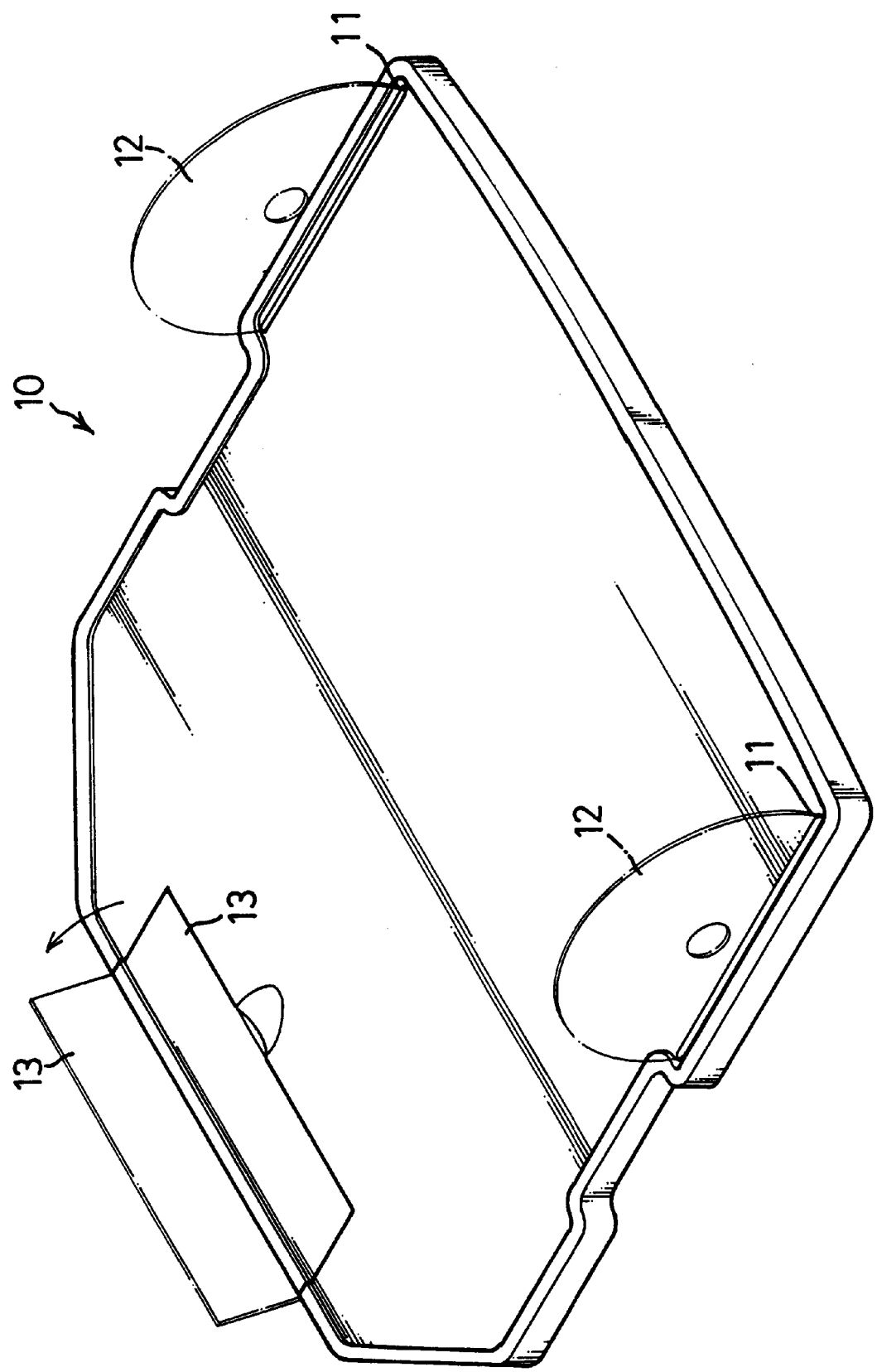
FIG. 1 is a top perspective view of the present invention.
Figure 2:
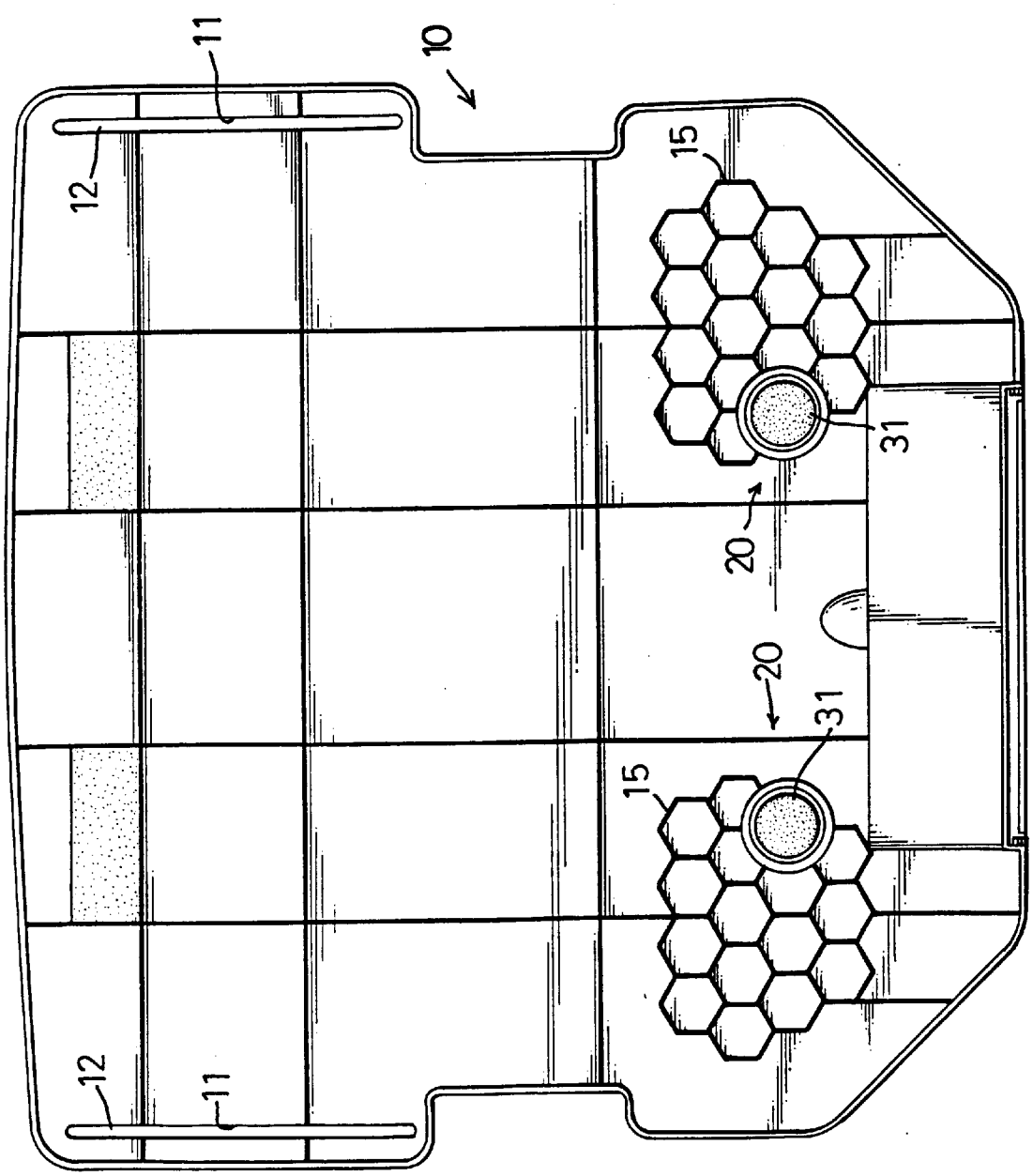
FIG. 2 is a bottom plan view of the present invention.
Figure 3:
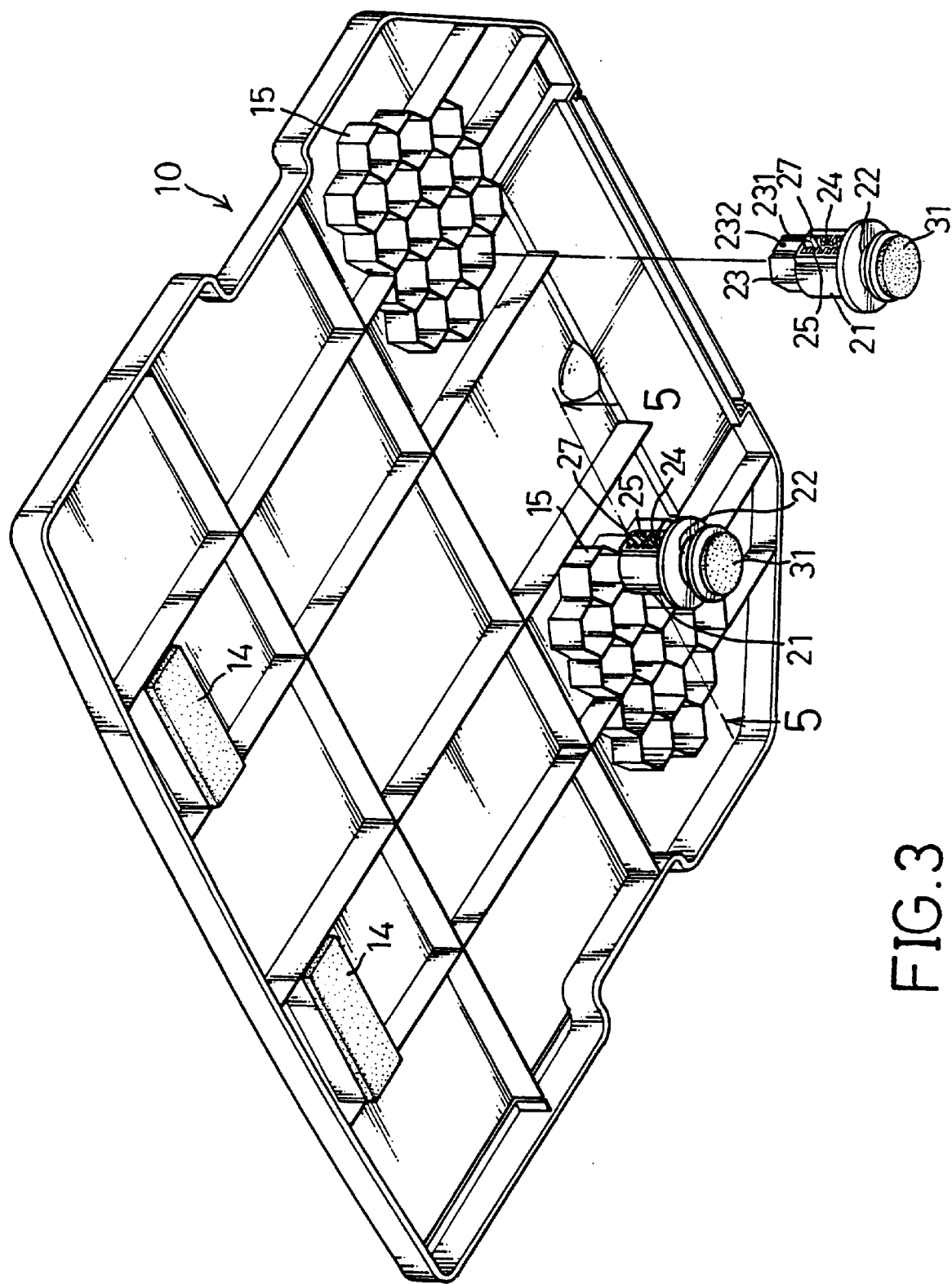
FIG. 3 is a bottom perspective view of the present invention.

Referring to FIGS. 1 to 3, the present invention relates to a shelf detachably mounted on the top of a monitor. The shelf includes a base (10) and two support feet (20) on the bottom.

The base (10) comprises a lip extension (13) fixedly attached on the back edge thereof and two slots (11) defined in opposite sides to hold discs (12). On the bottom of the base (10), two feet (14) are provided near the front end to attach to the top surface of a monitor, and two groups of polygonal seriate. sockets (15) are respectively formed near the back end to respectively install one support foot (20) in each group.

Figure 4:
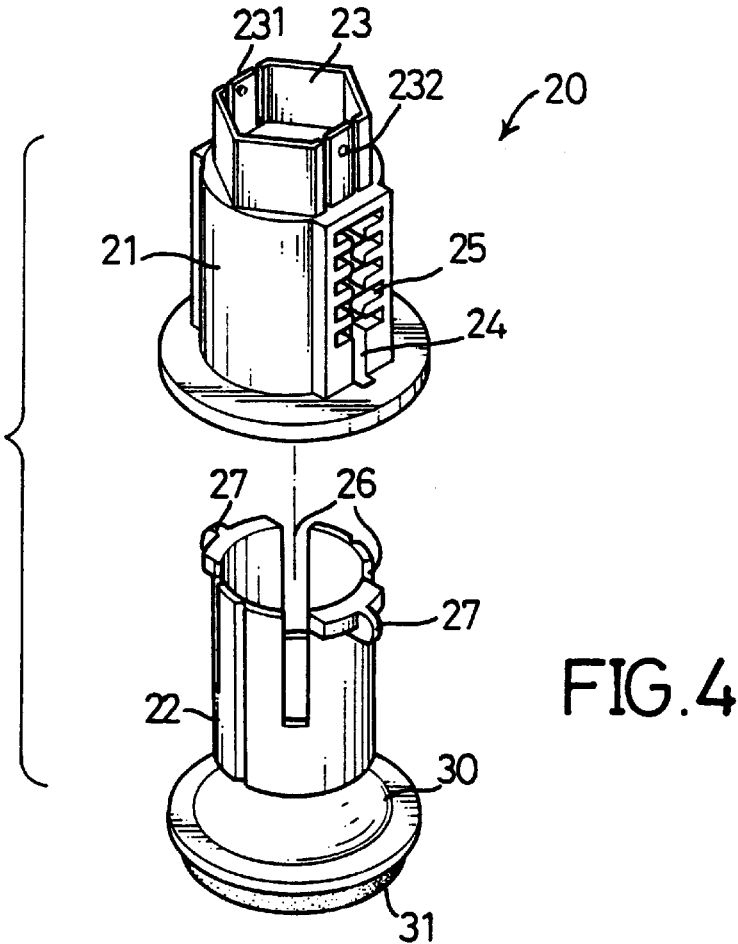
FIG. 4 is an exploded perspective view showing the structure of the support foot and the leveling shoe of the present invention.

With reference to FIG. 4, the support foot (20) includes an upper foot (21) and a lower foot (22).

The upper foot (21) has the top portion formed into a hollow polygonal plug (23) and the lower portion formed into a cylinder. The plug (23) further has two flexible pieces (231) each provided on the opposite sides with a boss (232) formed thereon. The plug (23) is able to be detachably inserted into one of the corresponding sockets (15) and is held in place by the contact between the boss (232) and the surface of the corresponding socket (15). The cylindrical portion of the upper foot (21) defines in opposite sides thereof a series of transverse slots (25) and a channel (24) in communication with each one of the slots (25).

The lower foot (22) is designed to be slidably received in the upper foot (21). The lower foot (22) has a plurality of longitudinal grooves (26) defined thereabout and spaced apart with each other in the body, and two bosses (27) formed on the opposite sides of the upper end. Each of the bosses (27) is T-shaped to correspond with the slot (25) and the channel (24). A flanged post (28) is integrally formed on the bottom of the lower foot (22), (seen in FIG. 5), and pivotally connected with a leveling shoe (30), which has an adhesive coating (31) attached on a free side of the shoe (30).

Figure 5:
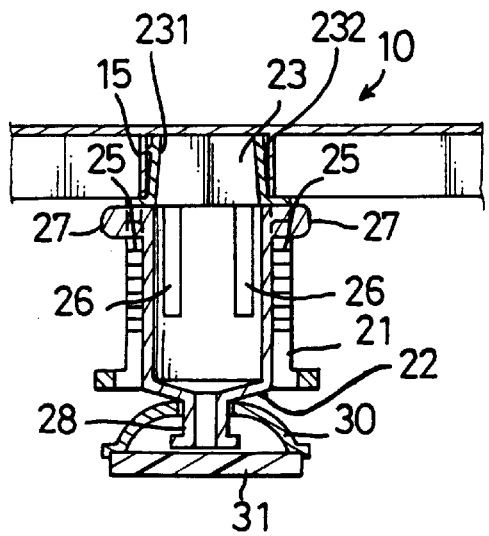
FIG. 5 is a cross sectional view taken along the section line 5—5 of FIG. 3 showing the assembled support foot and leveling shoe of the present invention.

With reference to FIGS. 4, 5 and, 7 due to the groove (26), the pair of opposite bosses (27) is able to be pressed toward each other, so that the lower foot (22) is able to be inserted into the upper foot (21). Once the lower foot (22) is inserted into the upper foot (21) and the pair of bosses (27) is released, the T-shaped bosses (27) will project out from the channel (24) and one of the slots (25). The engagement between the slots (25) in the upper foot (21) the T-shaped bosses (27) in the lower foot (22) securely holds the two pieces of the support foot (20) together. The flanged post (28) pivotally connected with the leveling shoe (30) provides a free rotation between the foot (20) and the leveling shoe (30), so that the base (10) of the invention is able to adjust itself to different surface planes of different monitors.

Figure 6:
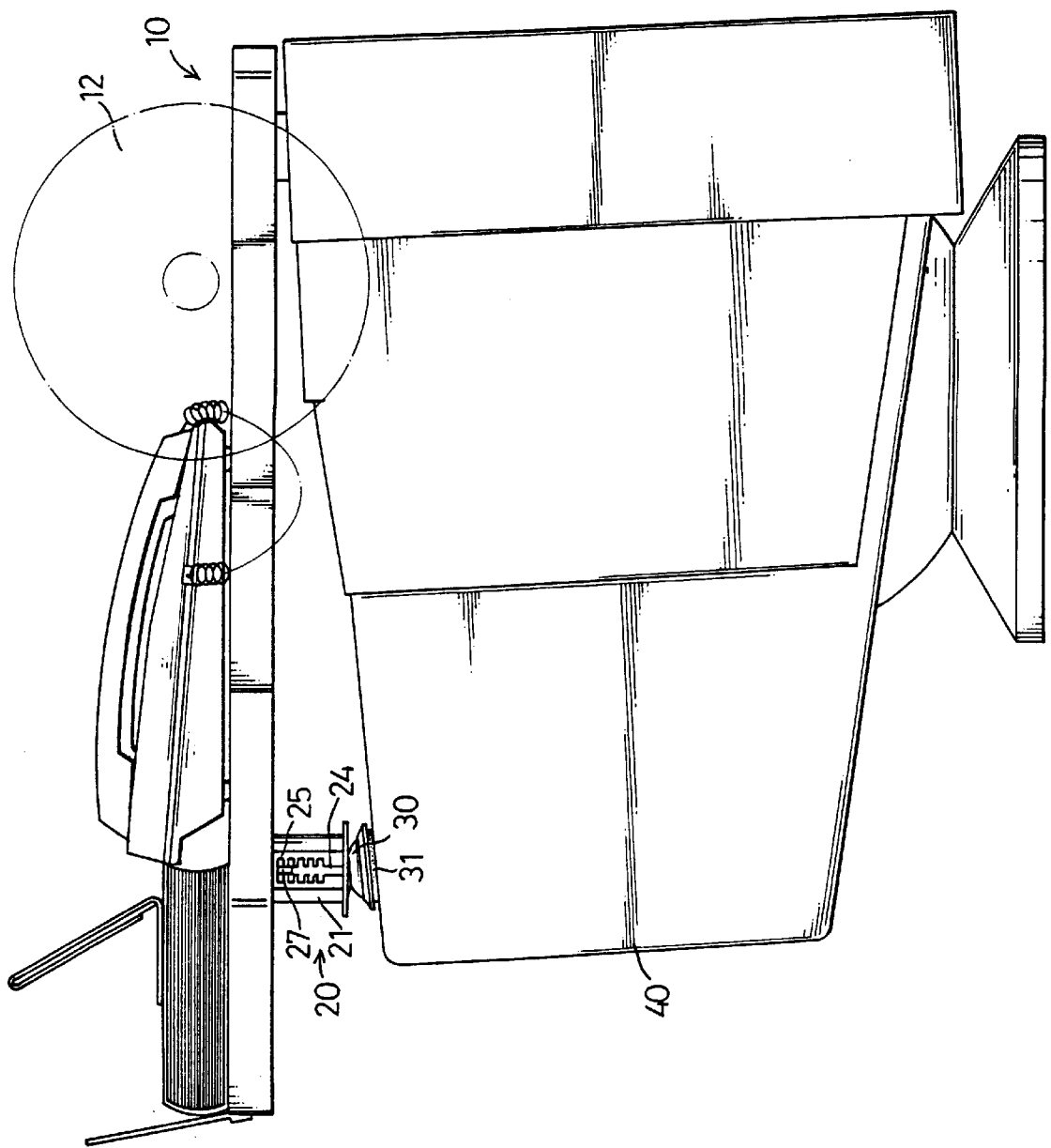
FIG. 6 is a side view of the present invention, showing a top shelf being placed on a monitor in accordance with the present invention.
Figure 7:
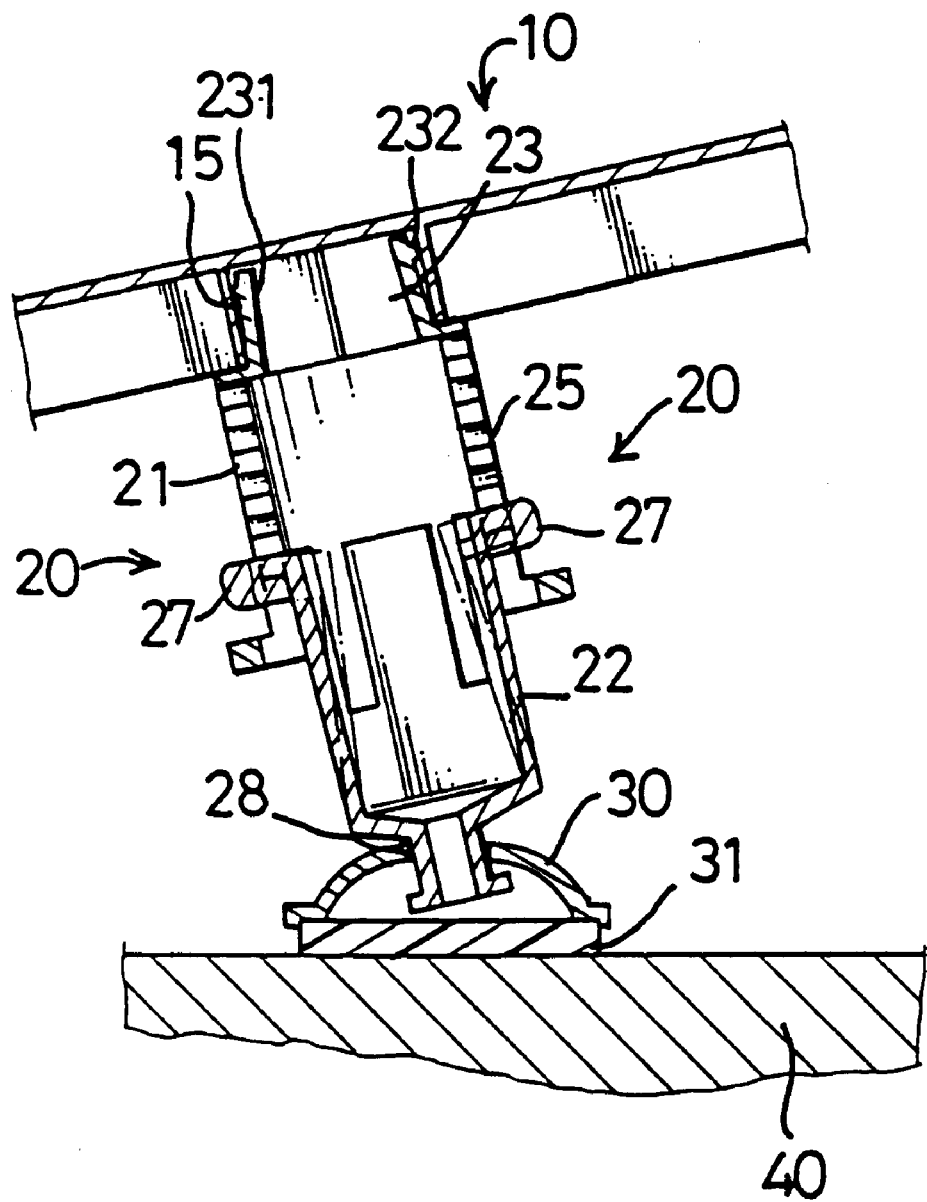
FIG. 7 is a cross sectional view taken along section line 5—5 of FIG. 3 showing the operation of the support foot and the leveling shoe of the present invention.

In FIG. 6, the base (10) is mounted on a monitor (40) in a level condition by adjusting the length of the support foot (20) by adjusting the depth to which the lower foot (22) is inserted into the upper foot (21).

Figure 8:
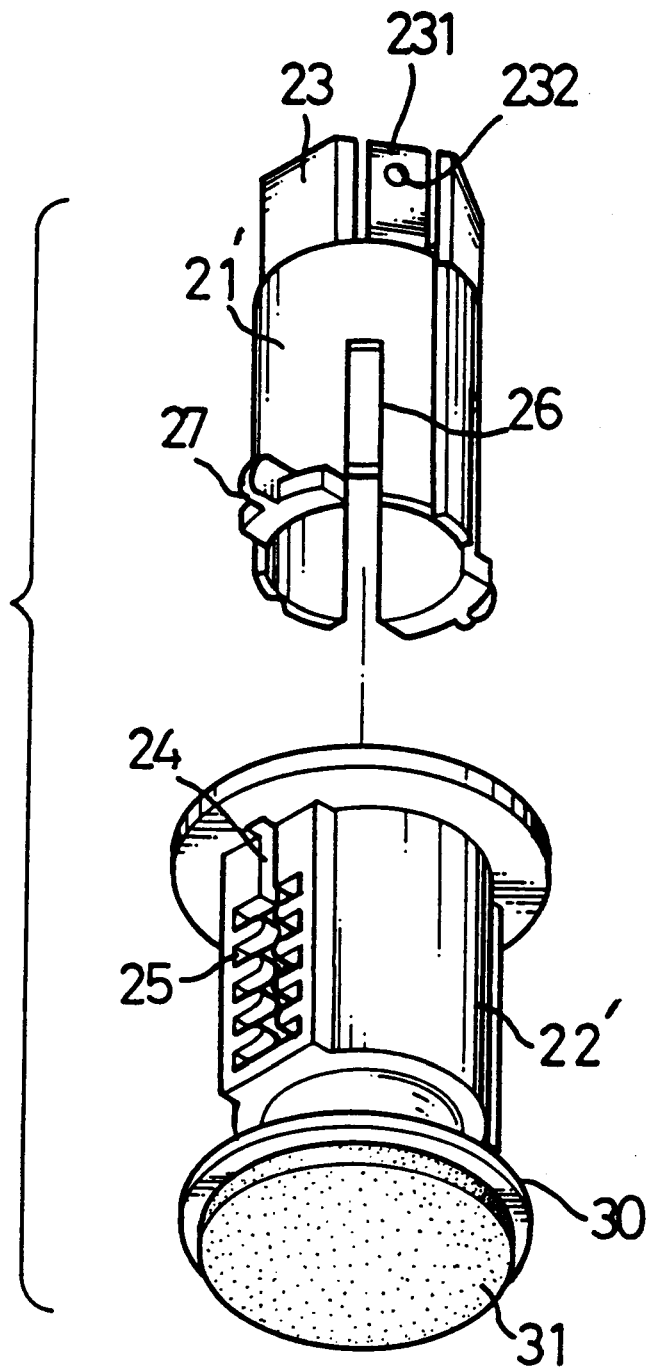
FIG. 8 is an exploded view of another embodiment of the support foot and the leveling shoe of the present invention.
Figure 9:
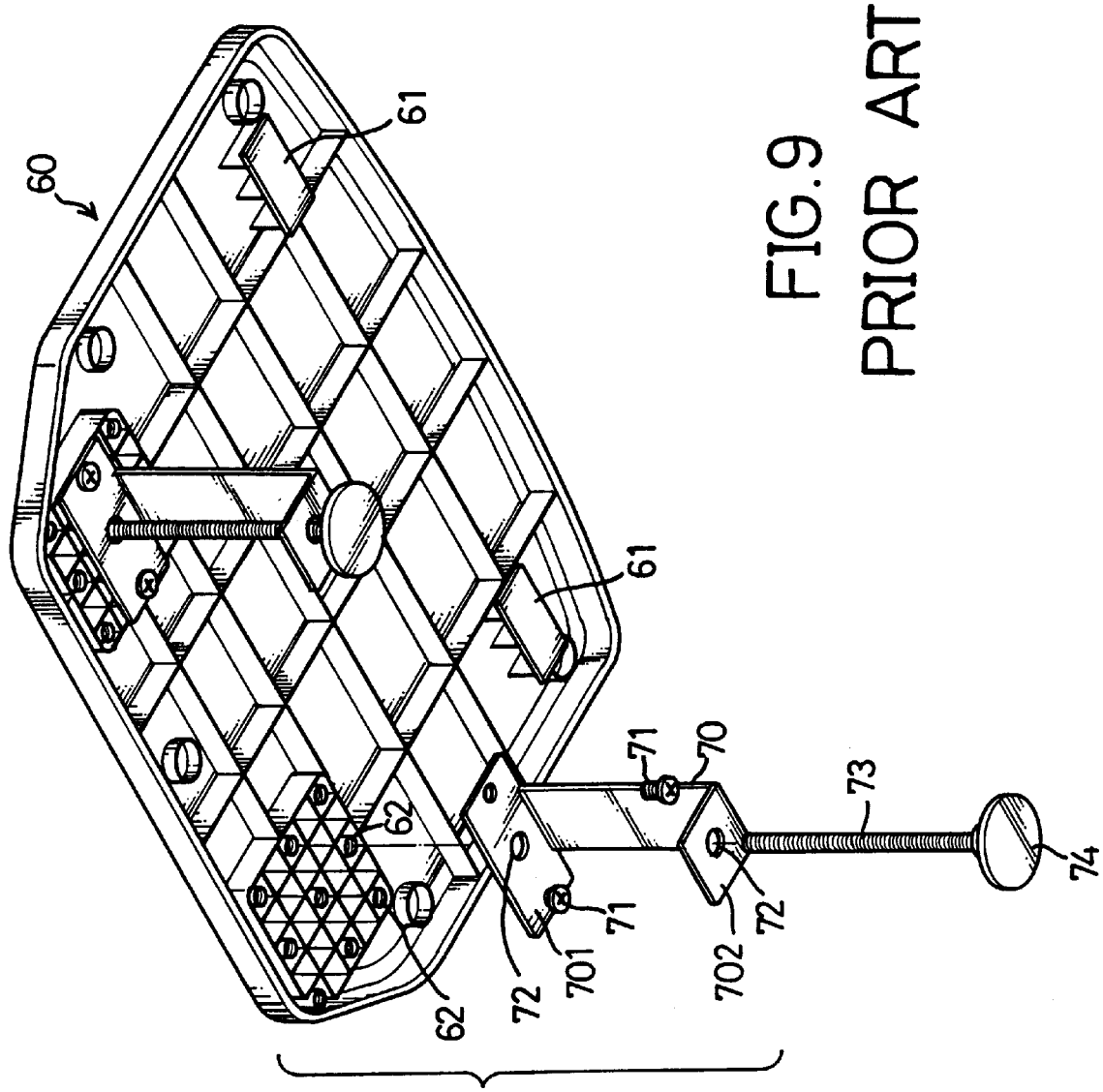
FIG. 9 is an exploded bottom perspective view of a conventional shelf.

Another practical embodiment, as shown in FIG. 8, of the present invention is to have the coupling structure of the lower portion of the upper foot (21') and the coupling structure of the upper portion of the lower foot (22') reversed from that as shown in FIG. 4.

The advantages of the invention are as follows:

The shelf of the present invention can be placed on a monitor with the adhesive coating on the leveling shoe bottom to enhance the stability of the shelf; The base of the shelf can be adjusted to a suitable height and a level condition by an easy adjustment of the extension and retraction of the support foot and the leveling of the leveling shoe;

The attachment of the support foot to the base by the connection of the polygonal socket and plug is stable, and the numerous attachment positions for the support foot can satisfy small adjustments among the seriate polygonal sockets;

The base further defines two slots therein on opposite sides for receiving discs therein and has a lip extension securely attached on the back end to prevent objects from falling off the shelf.

What is claimed is:

1. A shelf for a top of a monitor including a base and two support feet each connected between the base and a leveling shoe, the improvement comprising:

the base having at least two groups of seriate polygonal sockets formed on a bottom thereof near a back end to receive the support feet therein; each of the support feet includes a tubular upper foot and a tubular lower foot, the upper foot having a top end with a hollow polygonal plug formed thereon corresponding to the polygonal socket and having a series of transverse slots and a channel in communication with each one of the slots formed on opposite sides of a lower portion of the upper foot;

the lower foot is detachably telescopically inserted into the upper foot and has a flanged post integrally formed on a bottom thereof, wherein a plurality of grooves are axially formed in a surface thereof, and two T-shaped bosses are formed on opposite sides of an upper end thereof and corresponding to the channel and the slots of the upper foot so as to adjustably connect the upper foot to the lower foot when the lower foot is inserted into the upper foot; and the leveling shoe is pivotally connected to the flanged post and has an adhesive coating fixedly attached thereunder for attaching the leveling shoe on a top portion of a monitory.

2. The shelf for the top of a monitor as claimed in claim 1 further having two slots respectively defined in opposite sides of the base.

3. The shelf for the top of a monitor as claimed in claim 2, wherein the base has a lip extension fixedly attached on a back end thereof.

4. The shelf for the top of a monitor as claimed in claim 3, wherein the polygonal plug on each support foot has two flexible pieces attached on opposite sides thereof, each flexible piece being provided with a boss formed thereon.

5. A shelf for the top of a monitor including a base and two support feet each connected between the base and a leveling shoe, the improvement comprising:

the base having at least two groups of seriate polygonal sockets formed on a bottom thereof near a back end for receiving one of the support feet therein;

each of the support feet includes a tubular upper foot and a tubular lower foot, the upper foot having a top end with a hollow polygonal plug formed thereon corresponding to one of the polygonal sockets and a lower portion with a plurality of grooves axially formed in a surface thereof and a pair of T-shaped bosses formed on opposing sides of the lower portion;

the lower foot detachably telescopically receives the upper foot therein and has a flanged post integrally formed on a bottom thereof, the lower foot has a series of transverse slots and a channel in communication with each one of the slots on opposing sides thereof for respective engagement with the T-shaped bosses of the upper foot so as to adjustably connect the upper foot to the lower foot when the upper foot is inserted into the lower foot; and the leveling shoe is pivotally connected to the flanged post and has an adhesive coating fixedly attached thereunder for attaching the leveling shoe on a top portion of a monitor.

6. The shelf for the top of a monitor as claimed in claim 5 further having two slots respectively defined in opposite sides of the base.

7. The shelf for the top of a monitor as claimed in claim 5, wherein the base has a lip extension fixedly attached on a back end thereof.

8. The shelf for the top of a monitor as claimed in claim 5, wherein the polygonal plug has two flexible pieces attached on opposite sides thereof, each flexible piece being provided with a boss formed thereon.

* * * * *